United States Patent [19]
Lindberg

[11] Patent Number: 5,231,873
[45] Date of Patent: Aug. 3, 1993

[54] METHOD AND PLANT FOR MEASURING THE SOLID VOLUME OF A LOAD, SUCH AS A LOAD OF TIMBER

[76] Inventor: Ebbe Lindberg, P.O. Box 5940, S-826 06 Söderala, Sweden

[21] Appl. No.: 689,782

[22] PCT Filed: Nov. 16, 1989

[86] PCT No.: PCT/SE89/00663
§ 371 Date: Jun. 3, 1991
§ 102(e) Date: Jun. 3, 1991

[87] PCT Pub. No.: WO90/05896
PCT Pub. Date: May 31, 1990

[30] Foreign Application Priority Data
Nov. 17, 1988 [SE] Sweden .............. 8804149-6

[51] Int. Cl.⁵ ............................................. G01F 17/00
[52] U.S. Cl. ........................................................ 73/149
[58] Field of Search .......................................... 73/149

[56] References Cited
U.S. PATENT DOCUMENTS

| | | | |
|---|---|---|---|
| 3,769,834 | 11/1973 | Fletcher et al. | 73/149 |
| 4,184,371 | 1/1980 | Brachet | 73/149 |
| 4,192,394 | 3/1980 | Simpson | 177/45 |
| 4,770,033 | 9/1988 | Nicolai | 73/149 |

FOREIGN PATENT DOCUMENTS

| | | |
|---|---|---|
| 1923683 | 5/1979 | Fed. Rep. of Germany . |
| 1480470 | 5/1967 | France . |
| 2412825 | 7/1979 | France . |

Primary Examiner—Robert Raevis
Attorney, Agent, or Firm—Wegner, Cantor, Mueller & Player

[57] ABSTRACT

A method for measuring the solid volume of a load of timber comprises the steps of introducing the load (9) into a compartment (2) which is hermetically sealable against the ambient atmosphere and located in a housing (1) into which is gradually introduced a fill-out means (4,5) intended to reduce the volume, and thus increase the pressure, of the gas in said compartment; determining, after at least a certain excess pressure has been established in said compartment, the product of gas volume and gas pressure as a first reference value; and measuring the solid volume of the load as the difference between said first reference value and a second reference value of the product of gas volume and gas pressure, determined under identical conditions, but with no load in said compartment. The load (9) is introduced into the housing (1) on a goods vehicle (8), more precisely through a hermetically sealable gate (3,3') of the housing, and is left on said vehicle while the first reference value is being determined, where upon the vehicle is removed from the housing through a hermetically sealable gate.

6 Claims, 4 Drawing Sheets

5,231,873

METHOD AND PLANT FOR MEASURING THE SOLID VOLUME OF A LOAD, SUCH AS A LOAD OF TIMBER

BACKGROUND OF THE INVENTION

In the forest industry, the solid volume, not the weight, of the timber is used as a measure for determining the price of delivered timber, for example when logs are delivered to sawmills The measuring of the solid volume of such logs which are usually transported to the sawmill by vehicles on wheels, is, in actual practice, carried out by experienced tallymen who, with the aid of mechanical measuring tools and, possibly, arithmetical tables, estimate the solid biomass content of the load received at the sawmill. This estimate is, however, often rather uncertain and may differ by as much as 10–15% from the actual value. From the economic point of view, this is, of course, unsatisfactory to both suppliers and buyers, as the value of each load of timber may run to considerable amounts of money.

TECHNICAL FIELD OF THE INVENTION

The present invention aims at providing simple and exact measuring of the solid volume of vehicle loads, such as loads of timber, by means of a method which comprises the steps of introducing the load into a compartment which is hermetically sealable against the ambient atmosphere and located in a housing into which is gradually introduced a fill-out means intended to reduce the volume, and thus increase the pressure, of the gas in said compartment; determining, after at least a certain excess pressure in said compartment has been established, the product of gas volume and gas pressure as a first reference value; and measuring the solid volume of the load as the difference between said first reference value and a second reference value of the product of gas volume and gas pressure, determined under identical conditions, but with no load in said compartment.

PRIOR ART TECHNIQUE

Measuring the solid volume of objects by the above-mentioned method, is previously known from U.S. Pat. No. 4,770,033, FR-A-1,480,470 and DE-B-1,923,683. The measuring methods and devices disclosed in these documents and based on Boyle's law are, however, suitable for laboratory or small-scale operations only, and cannot be used for measuring the solid volume of loads of timber. Thus, DE-B-1,923,683 relates to a method of measuring in which a laboratory sample is put into a can which, preparatory to measuring, is sealed by means of a lid. In U.S. Pat. No. 4,770,033, the object to be measured is a liquid which is pumped into a sealable tank, while in FR-A-1,480,470 the object to be measured is an injured foot which is put into a casing especially designed for this purpose.

SUMMARY OF THE INVENTION

The present invention aims at applying the teaching of Boyle's law to the measuring of the solid volume of loads of timber and the like, thereby to obtain a far higher measuring accuracy. According to the distinctive features of the invention, this is achieved in that the load is introduced into the housing on a goods vehicle through a hermetically sealable gate of the housing, that the load is left on said vehicle while the first reference value is being determined, and that the vehicle is then removed from the housing through a hermetically sealable gate.

In addition to the method as such, the invention also relates to an apparatus for measuring the solid volume of loads of timber or the like, the distinctive features of the apparatus being defined in the appended claim 3.

In a particularly advantageous embodiment stated in claim 5, the housing is elongate and has, at two opposite ends, hermetically sealable gates. Thus, the vehicle carrying the load can be driven in through one gate and out through the other.

FURTHER ILLUSTRATION OF PRIOR ART TECHNIQUE

SU 1,137,315 intimates that gas pressure measuring could be used for measuring the volume of round timber, but does not explain how this is done in actual practice. The technique referred to in this document seems to be on a laboratory scale only in that no means of the type required in the present invention are disclosed. Furthermore, the method of SU 1,137,315 is not based on the concept of determining two different reference values for the product of gas volume and gas pressure after a certain excess pressure has been established in the measuring compartment.

BRIEF DESCRIPTION OF THE ACCOMPANYING DRAWINGS

In the drawings,

FIG. 1 is a schematic longitudinal section of an apparatus according to the invention, FIG. 2 is a longitudinal section of the same apparatus into which a vehicle with a load has been driven, FIG. 3 is a similar longitudinal section showing the vehicle without any load, FIG. 4 is a cross-section of an apparatus according to an alternative embodiment of the invention, FIG. 5 is a similar cross-section of the apparatus into which a vehicle with a load has been driven, FIG. 6 is a similar cross-section showing the vehicle without any load, and FIG. 7 is a schematic perspective view of a hermetically sealable gate of the apparatus.

DETAILED DESCRIPTION OF THE INVENTION

Figure 1:
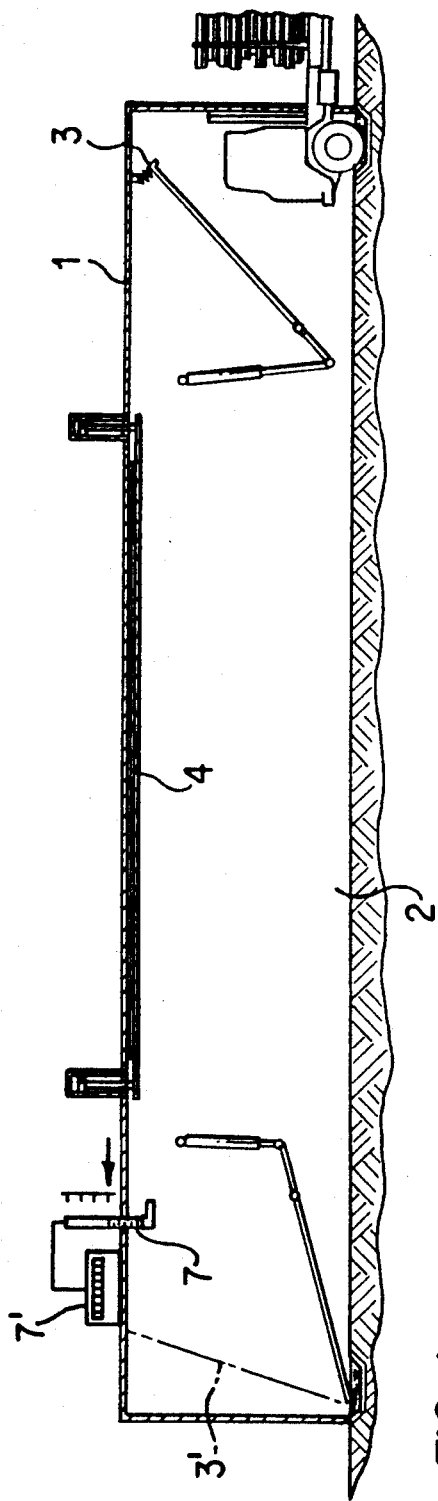
Figure 2:
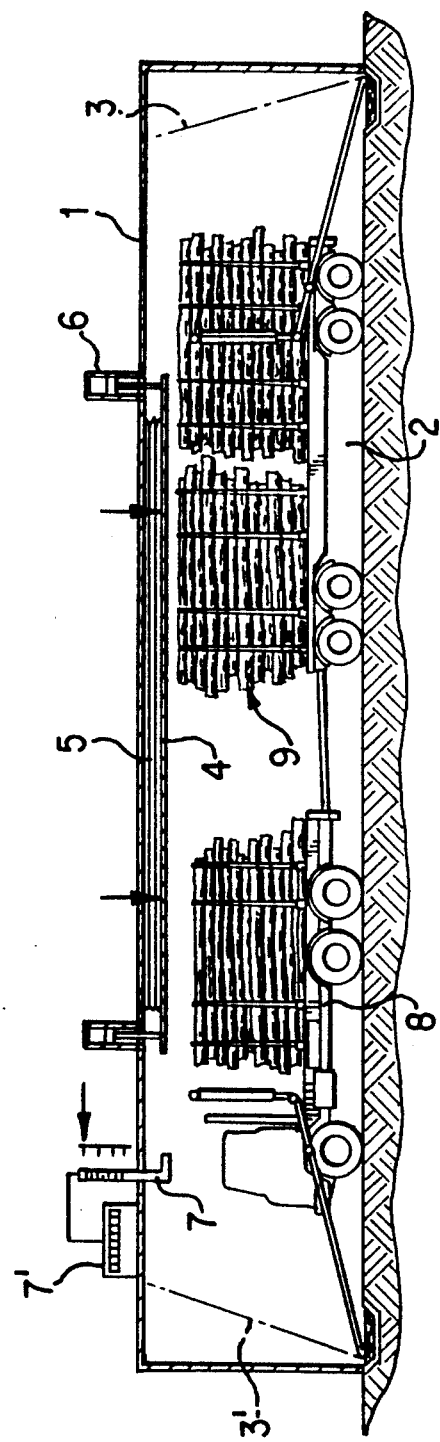
Figure 3:
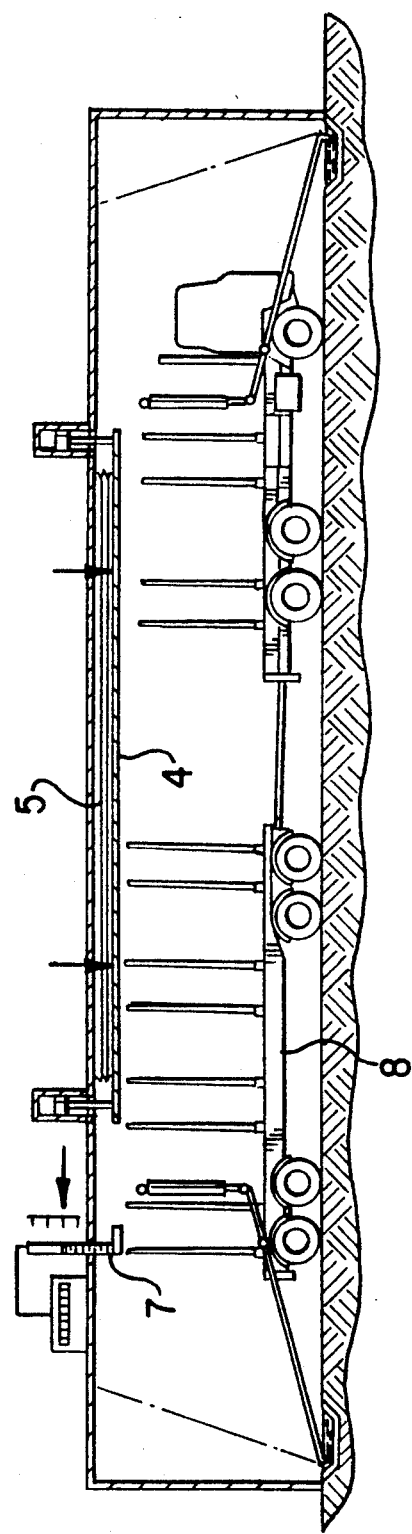

The apparatus shown in FIGS. 1–3 comprises a housing generally designated 1 and defining a compartment 2 which is hermetically sealable against the ambient atmosphere. Advantageously, the housing 1 is elongate and has gates 3,3' at its two opposite short sides. These gates may advantageously be constructed in the manner shown in FIG. 7. A panel 4 serving as a fill-out means is attached to the ceiling of the housing 1 and connected with a rectangular bellows 5 extending along the edge portions of the panel. The bellows 5 can expand vertically, while maintaining a gastight separation between the compartment 2 and the outside of the housing. The panel 4 can be raised and lowered by means of hydraulic cylinders or similar power generating means 6. Furthermore, the apparatus comprises a means 7 adapted to measure the gas pressure inside the compartment 2 and, in practice, connectible to a computer 7' for recording the measurement results.

In FIGS. 1–3, a vehicle is generally designated 8 and consists, in this example, of a logging truck. The load on the vehicle is generally designated 9 and may, in actual practice, be made up of stacks or bundles of logs, in particular logs of saw timber.

To carry the invention into effect, one proceeds as follows. First, the vehicle 8 with the load 9 is driven into the housing 1, whereupon the two gates 3,3' are shut, such that the compartment 2 is hermetically sealed against the ambient atmosphere. Next, the panel 4 is lowered from the ceiling by means of the hydraulic cylinders 6, such that the panel and the bellows 5 gradually reduce the volume of air in the compartment 2, and a certain excess pressure in relation to the atmospheric pressure is obtained in said compartment. When the desired excess pressure has been established, the panel 4 is stopped in a given position, and the air pressure in the compartment is measured and recorded by means of the computer 7,7'. Then, the vehicle is driven out and the load 9 discharged, whereupon the vehicle is again driven into the housing (see FIG. 3), and the gates 3,3' are closed. At this point, the panel 4 has been retracted to its initial position shown in FIG. 1. In a repeated measuring process, the panel 4 is lowered to the same position as in FIG. 2, and the gas pressure is then measured. Since there is no load on the vehicle, the air pressure in the compartment will be lower than in the measuring according to FIG. 2, the difference in air pressure between the state in FIG. 2 and the state in FIG. 3 being a measure of the solid volume of the load 9.

Instead of lowering the panel 4 the same distance and measuring different air pressures on both measuring occasions, one may naturally lower the panel to different levels while maintaining the same air pressure on both occasions, the difference between the different levels of the panel being a measure of the volume of the load. In other words, what matters is that the product of air volume and air pressure is determined as a first reference value, after a certain excess pressure has been established in the compartment 2, and that the solid volume of the load is measured as the difference between the first reference value and a second reference value of the product of air volume and air pressure, determined under identical conditions, but with no load in the compartment.

In practice, one may naturally determine one reference value, i.e. the one without load on the vehicle, once and for all. Thus, the special measuring of the reference value for the vehicle according to FIG. 3 need not be carried out separately each time. In this manner, measuring can be performed as a single, simple operation according to FIG. 2.

Figure 7:
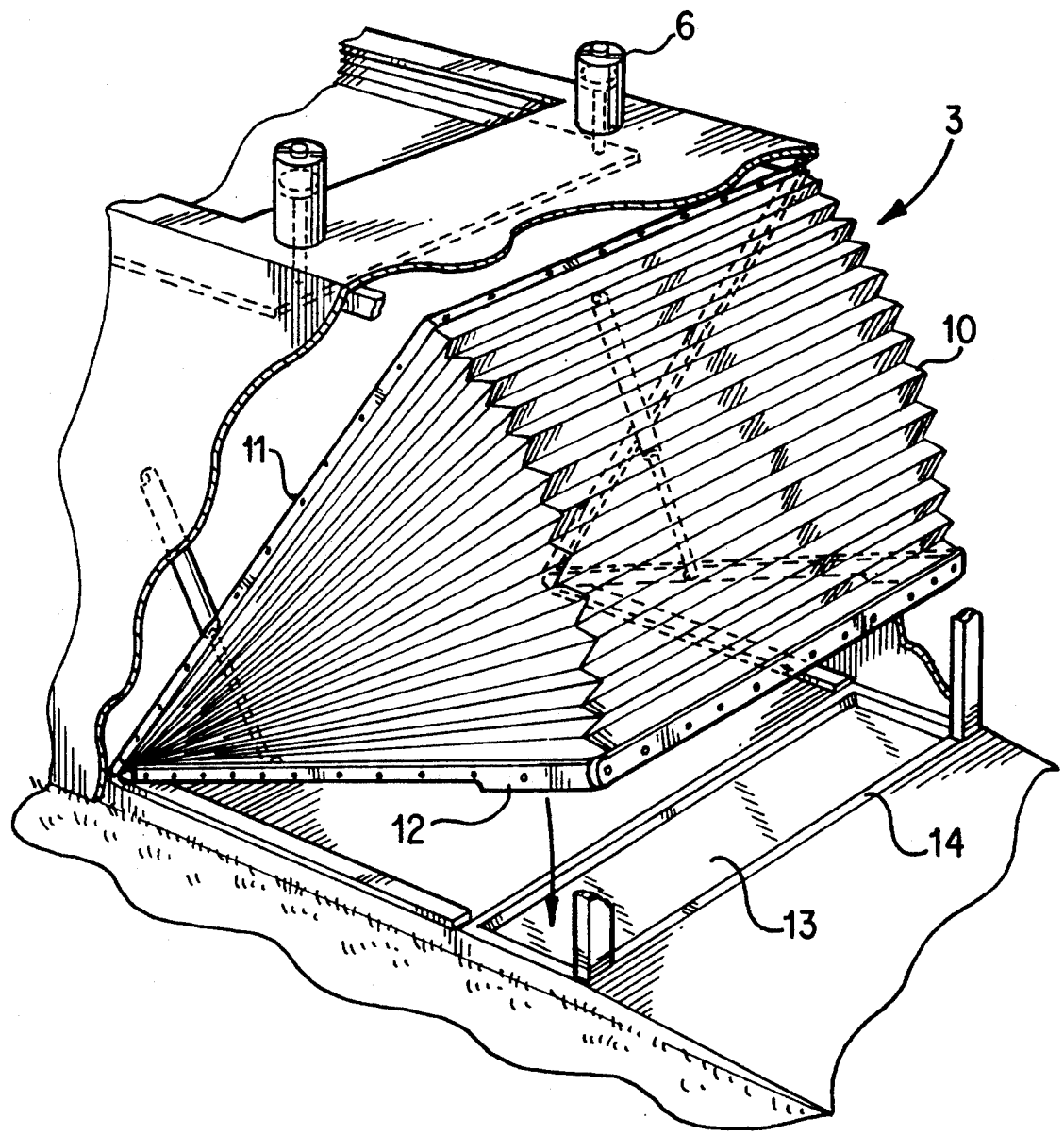

FIG. 7 shows how the gate 3 may form a bellows-shaped boundary wall 10 which, along an upper edge, is attached to an inclined, stationary frame 11 connected in airtight fashion to the ceiling and walls of the housing 1, and the lower edge of which is connected to a pivotable frame 12 which wholly or partly can be immersed in a liquid bath 13 in a trough 14. The liquid bath not only provides, in a simple and reliable fashion, a gastight sealing of the boundary wall 10, but also cleans the wheels of the vehicle when these pass through said bath.

Figure 4:
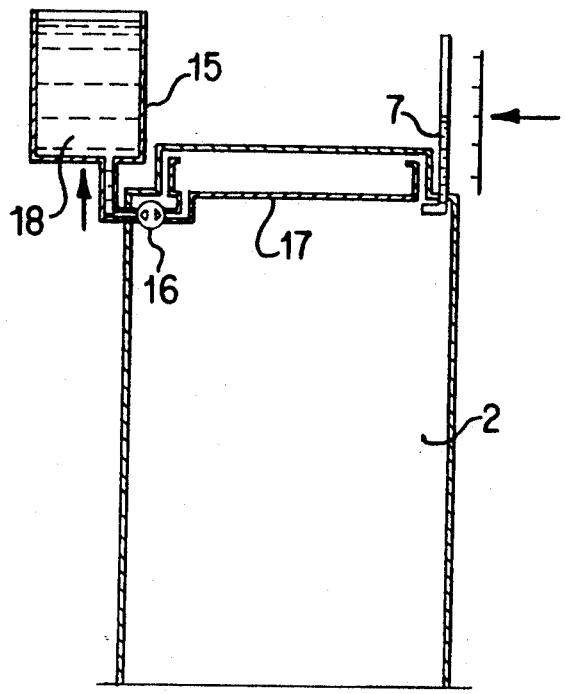
Figure 5:
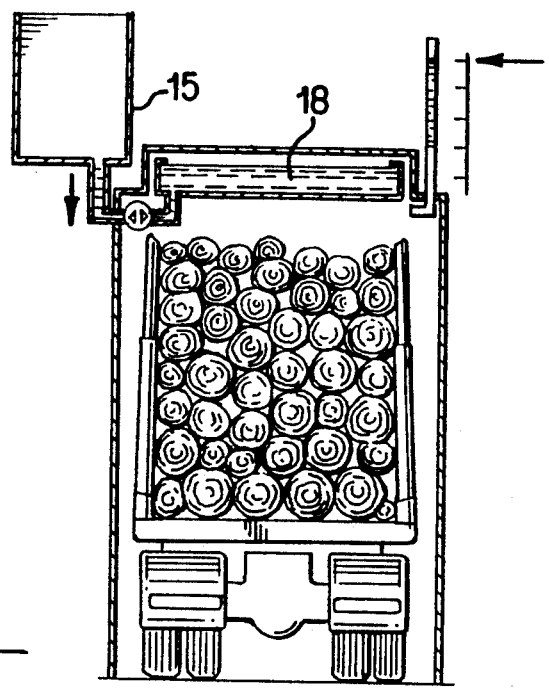
Figure 6:
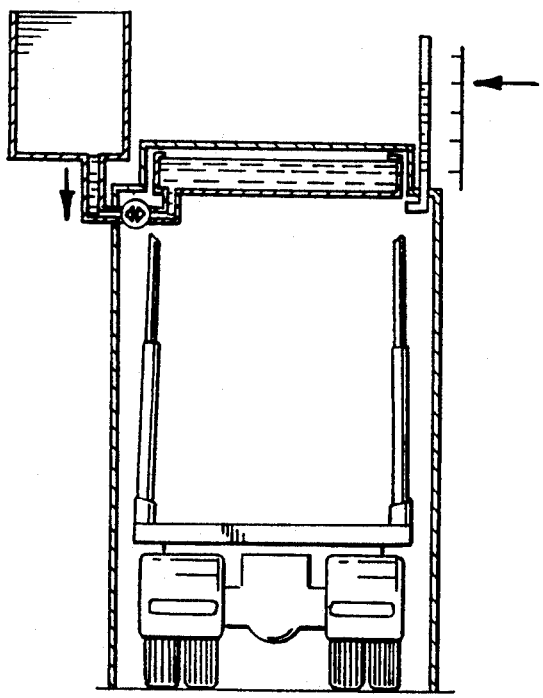

In lieu of the mechanical fill-out means 4 and 5 exemplified in FIGS. 1-3, other fill-out means can be used to produce the necessary excess pressure in the compartment 2. FIGS. 4-6 show an embodiment in which a liquid is used as fill-out means, a storage container 15 being disposed outside the compartment 2 and containing a liquid 18, such as water, which can be supplied to and discharged from a trough 17 inside said compartment via a pump 16. By pumping liquid 18 from the container 15 into the trough 17, after having sealed the compartment 2 as described above, an excess pressure of the air in the compartment 2 can be established, and this pressure can be measured by a means 7 in the manner described above.

Although it is possible to have only one gate on the housing, it is preferred in practice to provide the housing, as shown in the drawings, with hermetically sealable gates at each one of two opposite ends of said housing which suitably is elongate with the gates situated at the two short sides of the housing. Most preferred, the housing with two gates has a length, width and height only slightly exceeding the corresponding dimensions of the vehicle, such that the volume of the housing is minimal in relation to the size of the vehicle, thus ensuring speedy measuring operations.

I claim:

1. A method for measuring the solid volume of a load, said method comprising the steps of:
   introducing the load into a compartment which is substantially hermetically sealable against ambient atmosphere, said compartment being located in a housing, said housing having a substantially hermetically sealable gate through which the load can be introduced on a goods vehicle;
   gradually reducing the volume and increasing the pressure of a gas contained in said compartment to establish at least a predetermined excess pressure in said compartment;
   determining a first reference value equal to the product of the gas volume and the gas pressure in said compartment while said load is disposed ion said goods vehicle;
   transferring said vehicle and the load disposed thereon out of said housing through said substantially hermetically sealable gate;
   determining a second reference value equal to the product of gas volume and gas pressure under the same conditions as the determination of said first reference value but without any load in said compartment; and
   calculating the solid volume of the load as the difference between said first reference value and said second reference value.

2. A method as claimed in claim 1, wherein said housing is elongated and wherein two such hermetically sealable gates are used, one disposed at each end of said elongated housing.

3. A method as claimed in claim 1, characterised in that the vehicle, after the first reference value has been determined, is driven out of the compartment for discharging the load, whereupon the unloaded vehicle is again driven into said compartment for determining said second reference value.

4. An apparatus for measuring the solid volume of a load, said apparatus comprising:
   a housing substantially hermetically sealable against the ambient atmosphere, said housing having a compartment adapted to receive a removable filler which, when introduced into said compartment, reduces the volume thereof and increased the pressure therein;
   first determining means for determining a first reference value equal to the product of the gas volume and the gas pressure in said compartment while said load is disposed on a goods vehicle;

second determining means for determining a second reference value equal to the product of gas volume and gas pressure under the same conditions as the determination of said first reference value but without any load in said compartment; and means operatively coupled to said first and second determining means for calculating the solid volume of the load as the difference between said first reference value and said second reference value.

5. An apparatus as claimed in claim 4, wherein said housing is elongated and has a hermetically sealable gate disposed at each end of said elongated housing.

6. An apparatus as claimed in claim 5, characterised in that a lower edge of the gate is immersible in a liquid bath intended to substantially hermetically seal the lower edge of the gate when the latter is closed, but also to clean the wheels of the vehicle driven into the compartment through the gate.

* * * * *